(12) United States Patent
Calafell Monfort (10) Patent No.: US 8,986,499 B2
(45) Date of Patent: Mar. 24, 2015

(54) PROCESS FOR RECYCLING WASTE PAPER, PRODUCT OBTAINED THEREFROM AND ITS USES

(75) Inventor: Margarita Calafell Monfort, Barcelona (ES)

(73) Assignee: Universitat Politecnica de Catalunya, Barcelona (ES)

( * ) Notice: Subject to any disclaimer, the term of this patent is extended or adjusted under 35 U.S.C. 154(b) by 0 days.

(21) Appl. No.: 13/697,091

(22) PCT Filed: May 16, 2011

(86) PCT No.: PCT/IB2011/052127
§ 371 (c)(1),
(2), (4) Date: Jan. 17, 2013

(87) PCT Pub. No.: WO2011/141899
PCT Pub. Date: Nov. 17, 2011

(65) Prior Publication Data
US 2013/0118697 A1    May 16, 2013

(30) Foreign Application Priority Data
May 14, 2010 (EP) .................................... 10382123

(51) Int. Cl.
*D21C 5/00* (2006.01)
*D21C 5/02* (2006.01)
*D21B 1/02* (2006.01)
*D21B 1/34* (2006.01)
*D21H 27/10* (2006.01)

(52) U.S. Cl.
CPC *D21C 5/02* (2013.01); *D21B 1/021* (2013.01); *D21B 1/345* (2013.01); *D21C 5/005* (2013.01); *D21H 27/10* (2013.01)

USPC .............................................. 162/5

(58) Field of Classification Search
None
See application file for complete search history.

(56) References Cited

U.S. PATENT DOCUMENTS

2003/0106654 A1    6/2003    Li et al.
2005/0098278 A1    5/2005    Rosencrance et al.
(Continued)

FOREIGN PATENT DOCUMENTS

ES    2241408 B1    12/2006
WO    WO-00/15899 A1    3/2000
(Continued)

OTHER PUBLICATIONS

Gast, D., "International Search Report", for PCT/IB2011/052127, as mailed Jul. 22, 2011, 3 pages.
(Continued)

Primary Examiner — Jacob Thomas Minskey
(74) Attorney, Agent, or Firm — Winstead PC (57) ABSTRACT

The present invention relates to a bioprocess for recycling waste paper originated from high quality paper comprising the following steps: a) preparation of pulp; b) dilution with water of the pulped material obtained in a) c) enzymatic treatment of pulp; d) addition of inorganic salts and glues; e) dilution with water of the material obtained in d) f) filtration by vacuum; optional press; and g) drying In particular, said high quality paper is printed paper. The present invention also relates to the obtainable product by the above mentioned process. The present invention further relates to the different uses of the product such as building and construction material, eco-packaging material and eco-decorative material.

10 Claims, 5 Drawing Sheets

(56) References Cited

U.S. PATENT DOCUMENTS

| | | |
|---|---|---|
| 2006/0054290 A1* | 3/2006 | Call .................................. 162/1 |
| 2006/0102299 A1 | 5/2006 | Elgarhy et al. |
| 2007/0158039 A1 | 7/2007 | Rosencrance et al. |
| 2009/0165967 A1 | 7/2009 | Rosencrance et al. |

FOREIGN PATENT DOCUMENTS

| | | |
|---|---|---|
| WO | WO-0212618 A2 | 2/2002 |
| WO | WO-2004011717 A2 | 2/2004 |
| WO | WO-2005124016 A1 | 12/2005 |

OTHER PUBLICATIONS

Oki, Tatsuya, et al.; "Coagulation Using Kerosene for Magnetic Deinking of Waste Office Paper"; Materials Transactions, vol. 44, No. 2; 2003; pp. 320-326.

Azzam, Mohammed O.J., et al.; "The Role of Particle Size on the Deposition Efficiency of Ink on Plastic Spheres"; Colloids and Surfaces A: Physicochem. Eng. Aspects 230; 2004; pp. 207-216.

El-Shall, H., et al.; "Separation of Ink Particles from Waste Paper by Fine-bubbles"; KONA No. 23, 2005; pp. 122-128.

* cited by examiner

PROCESS FOR RECYCLING WASTE PAPER, PRODUCT OBTAINED THEREFROM AND ITS USES

FIELD OF THE INVENTION

The present invention discloses a process for recycling waste paper originated from high quality paper. The present invention also describes the obtainable products by said process and different uses of said products.

BACKGROUND OF THE INVENTION

Nowadays and due to the increasing selective collection of paper and cardboard, the problem for the waste papers is becoming important in cities and industrialized areas. Although in the present days a big amount of these waste papers are recycled. Many of these waste papers are returning to the paper or cardboard cycle, but a significant part of theses waste papers include important amounts of additives, inks, glues, wet resistance resin, etc., and makes the recycling process very expensive and in many cases not sustainable from an environmental point of view. This kind of waste or residue must be sent to dump, becoming then a problem for the environment and the economics in a company.

This problem is particularly found in the printing and graphic design companies since they try to avoid generating waste or by-products because of both environmental and economical reasons. In general, there is a trend to reduce the bulk of paper sent to rubbish dump and/or incinerator. Due to these reasons recycling paper and cardboard has been publicly promoted. By recovering and recycling the already used paper the life span of cellulose can be extended and virgin fiber consumption is avoided. Printing and graphic design companies use a different range of papers and inks Some of the by-products or wastes already have a known treatment and their recycling is a part of the normal process in the product life cycle in this industry.

However, there is some paper which is not included in this known recycling treatment. It is high quality paper having a high content of additives. A high quality printing process cannot recover waste paper mainly because of the inks and additives present which makes repulping and recycling a very difficult process. Up to date, all waste produced in the production of this kind of paper must be treated as a waste for a rubbish dump thereby becoming a contaminating source and a significant loss of material and energy, apart from involving a high cost.

Additionally, companies producing high quality printing and writing paper cannot use recycled paper mainly because there is a loss of quality in the final product by the use of pulps in the recycling process.

An approach to solve this problem is by removing additives and inks There are lots of documents disclosing deinking processes (see, for example: US 2009165967; US 2007158039; *Separation of ink particles from waste paper by fine-bubbles*. El-Shall H., Moudgil B. M., El-Midany A. KONA (2005), 23, 122-128; WO 2005124016 A1; US 2005098278; WO 2004011717; *The role of particle size on the deposition efficiency of ink on plastic spheres*. AZZAM Mohammed O. J., MOUSA Hasan, AL-MAQRAEI Abdulajalil A. *Colloids and Surfaces A: Physicochemical and Engineering Aspects* (2003), 230(1-3), 207-216; US 2003106654; *Coagulation using kerosene for magnetic deinking of waste office paper*. Oki Tatsuya, Owada Shuji, Yotsumoto Hiroki, Tanuma Hirokazu, Takeuchi Yuu. *Materials Transactions* (2003), 44(2), 320-326; WO 2002012618); but most of them use chemical products which can even produce a higher environmental contamination. In some other cases, after removing those additives other products should be added leading to a time-consuming work with a consumption of material and energy and, consequently, becoming a low cost-effective process.

Another example is the document WO 00/15899 which discloses a method for deinking and decolorizing a printed paper, comprising (a) pulping the printed paper to obtain a pulp slurry and (b) diluting the pulp slurry but, where the dye is decolorized with one or more laccases in the presence of oxygen and optionally one or more chemical mediators.

Recycling Technology

Recycling technology has been proved to be effective for paper from newspapers and cardboard. These products are made of paper containing a low content of fillers and repulping is easy to be carried out. Therefore, for products with a high content of fillers the repulping process is more difficult.

In the currently existing methods for obtaining pulp from used high quality paper, there is always a loss in the resistance of the recovered fiber, a loss in the total fiber yield and a problem in removing additives and inks from the paper. There is also the additional problem of having to add virgin paste to the recovered pulp to obtain an acceptable resistance in the final product. This makes the process and the product more expensive.

Sometimes, mechanical processes such as flotation and flocculation are used for removing non-cellulosic additives of the used paper, such as resins, plastics, polymers, varnishes, coatings, preparations pre- and post-inking or other non-cellulosic products.

In general, additives are removed from the fibers during the defibrillation stage. The used paper is treated in a pulper at alkaline conditions at 50-60° C. in order to achieve a good defibrillation and a pulpable paste. An alternative process is carrying out this operation in cold conditions, thickening the pulp until a consistence higher than 15%, heating it with steam to 60° C. and then introducing a deinker and a bleach agent. The pulp is then left for 2 or 3 hours in a maceration tower with mechanical stirring.

A first problem found with this method is that, in the heating treatment, all substances under melting point remain dispersed in the pulp and cannot be removed any longer, thereby causing subsequent problems in the paper making machine occluding filters, grilles, valves and conductions.

A second problem found is that, these deinking techniques are low efficient for the most modern inks The present inks use resins with a wet resistance as a fixation carrier on the fiber and with these processes, inks cannot be separated from the paper surface and even the adherence to it is not weakened.

A third problem is that the temperature of the deinking process cannot be increased since the extended treatments for a cellulose fiber in alkaline medium at high temperatures makes the pulp get a yellowish color, especially when pieces of wood remains within the paper.

One of the present inventors previously disclosed a process (ES2241408 B1) for recycling waste paper printed on gravure with inks resistant to humidity. However, the mentioned process used a very acidic pH and there is a lot of waste during the process, along with a dramatic reduction of the cellulose fiber length, causing thereby a reduction on the breaking strength in the recycled material. The new process disclosed in the present invention overcomes the mentioned drawbacks and additionally allows to obtain a product with improved properties such as fire-resistant, thermal and acoustic insulation, water-proof characteristics, dimensional stability, low density, high mechanical resistance, hard as wood but capable of being molded, and recyclable.

Therefore, a first object of the present invention is an optimized bioprocess for recycling waste paper originated from high quality paper (printed paper).

A second object of the present invention is the product obtainable from the bioprocess according to the first object.

This "ecological" material has no environmental impact either in its production or in its use. Additionally, it gives added value to the tons of waste paper and cardboard which are accumulated in big cities. The material of the present invention has properties equivalent to the non ecological materials which can then be replaced, with the advantage of being a natural material. In addition, the material production process does not have a negative impact, because it does not generate residues and all the used residues components are recycled in the process itself As mentioned above, the present product has improved properties such as fire-resistant, thermal and acoustic insulation, water-proof characteristics, dimensional stability, low density, high mechanical resistance, hard as wood but capable of being molded, and recyclable.

A further object of the present invention is the use of the product according to the second object as building and construction material, ecologic packaging material and as eco-decorative material.

SUMMARY OF THE INVENTION

The present invention relates to a bioprocess for recycling waste paper originated from high quality paper comprising the following steps:
  a) preparation of pulp;
  b) dilution with water of the pulped material obtained in a)
  c) enzymatic treatment of pulp;
  d) addition of inorganic salts and glues;
  e) dilution with water of the material obtained in d)
  f) filtration by vacuum; optional press; and
  g) drying In particular, said high quality paper is printed paper.

The present invention also relates to the obtainable product by the above mentioned process.

The present invention further relates to the different uses of the product such as building and construction material, eco-packaging material and eco-decorative material.

DETAILED DESCRIPTION OF THE INVENTION

The present invention relates to a process for recycling waste paper originated from high quality paper comprising the following steps:
  a) preparation of the pulp, wherein waste papers are fed in a pulper with water having a consistency between 15 and 20%;
  b) dilution with recycled water of the pulped material obtained in a) until a consistency between 5 and 10%;
characterized in that also comprises the steps of:
  c) enzymatic treatment of the diluted pulped material obtained in b);
  d) addition of one or more inorganic salts and one or more glues to the material obtained in treatment c);
  e) dilution with water of the material obtained in d) until a consistency between 1 and 3%;
  f) filtration of the material obtained in e) by vacuum and optional press;
  g) drying the filtered material obtained in f);
    wherein there is a feedback of residual water suspension after the filtration in step f) into containers where steps b) and e) take place.

The terms "residue" and "waste" are used interchangeably in the present invention when referred to useless or profitless material.

The term "consistency" is referred in the present invention to the percentage of dry raw material (usually a residue) in a solvent (usually water).

Unless otherwise stated, the term "waste paper" is always referred to waste paper originated from high quality printed paper. The "waste paper" is structurally understood herein as natural polymers with cellulose base, such as paper cellulose, cotton, straw, etc. In a more preferred embodiment, this waste paper has ashes (between 15% and 40%) and cellulosic fibers (between 60% and 85%) which comprise short-fiber hardwood (between 70% and 80%) with long-fiber conifer (between 20% and 30%).

Figure 1:
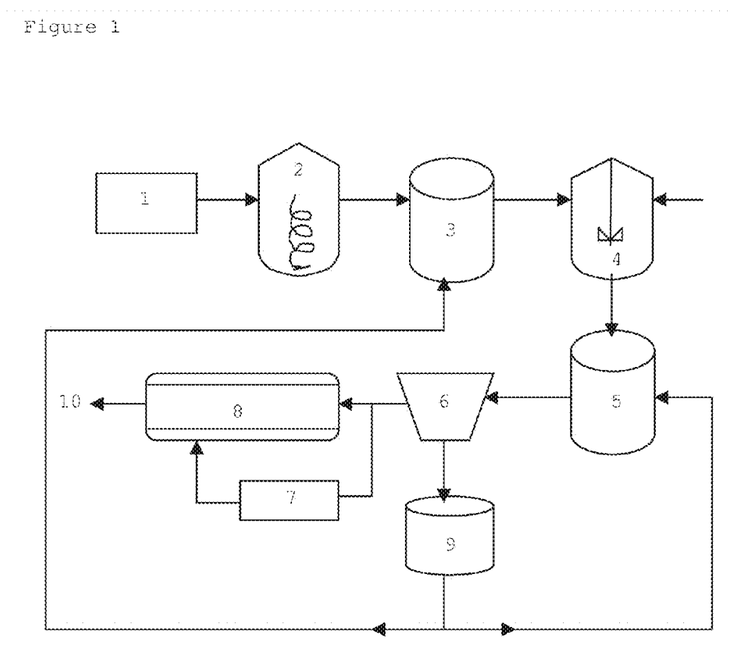
FIG. 1 represents the biotechnological process of the present invention for recycling waste paper originated from high quality paper:
  (1) Waste paper feed
  (2) Pulper
  (3) First container for dilution
  (4) Stirring
  (5) Second container for dilution
  (6) Vacuum filter
  (7) Press process
  (8) Drying heater
  (9) Water filtrate collector
  (10) Final product

By waste paper originated from "high quality paper" is understood herein waste paper which cannot be repulped nor recycled in the paper and cardboard industry, such as offset-paper or high quality gravure, magazine paper with high concentrations of waterproofing resins and water-resistant inks Step a The step a) of the present process is carried out in the pulper (2) by adding the waste paper (1) usually in the size of sheet of paper and having a consistency between 15 and 20% in running water. This step a) can be carried out in the presence of enzymes, which makes the process faster and improves the defibrillation, at room temperature or keeping the temperature between 25 and 40° C. pH should be kept between 5 and 9, preferably around 7.

In a preferred embodiment, said enzymes are hydrolases.

Step b)

In step b), the already-pulped material is introduced in a container (3) with water for dilution. 90% of this water is recycled from the collector (9) and 10% is running water in order to compensate the evaporation, thereby achieving a consistency for the material between 10 and 5%.

Step c)

The mixture obtained in step b) is brought to container (4) with a stirring mechanism. There the pulp is treated with enzymes (between 0.05%-1% respects to dry matter—DM-). Temperature is controlled (between 25-50° C.) and pH is controlled (between 6 and 9) to optimally run the enzymatic reaction In a preferred embodiment, said enzymes are oxidorreductases and laccases.

Step d)

Between half and one hour later, inorganic salts, preferably aluminum salts and more preferably aluminum sulfate, and one or more natural glues comprising natural resin acids, such as abietic acid, or its esters with glycerol or its sodium salts or its quaternary ammonium salts, are added in an amount between 1 and 5% respect to DM. In this step, the pH is preferably maintained at pH 7 and at a temperature between 25 and 50° C.

The concentration of enzymes from step c) and additives from step d), will determine the variability in the mechanical properties.

Step e)

The mixture obtained in step d) is then introduced in a second container (5) with water for dilution, wherein said water is recycled water from the collector (9). Said dilution allows to obtain a material with a consistency between 1 and 3%, preferably about 1%, at a pH 6-9 and a temperature at 25-40° C.

Step f)

The product obtained in e) is vacuum filtered in a mould (6). The water filtrate is collected in container (9) and re-fed again in the process, namely in containers (3) and (5).

Optionally, the solid product obtained from the filter (6) is pressed in a press (7) to obtain a more compact material.

Step g)

The product obtained in step f) is removed from the mould and then introduced into a forced-air drying heater (8), for few minutes at 150° C. Then a 1° C./min decreasing gradient to 80° C. is applied and kept for 60 to 120 minutes (depending on the shape and design of the material) for dehydrating and curing the final product (10).

The present invention also relates to the product obtainable by the process of the present invention.

Said product, which is a cellulosic material, has been characterized by the following tests:
air permeability
water absorption ($Cobb_{30}$ method)
water absorption by immersion and deformation
hygro-expansion
Impact acoustic insulation
Aerial noise acoustic insulation
Fire behaviour
Density
Tensile Strength
Compressive strength
Flexural strength A brief description or reference is made for each test as follows.

Air Permeability Determination

Air permeability has been determined according to UNE standard 57-066-86. The method determines the average volume of air which crosses a surface unit per increase of pressure and time unit. It is expressed in µm/(Pa·s) and it is calculated as follows:

$$\text{Permeability} = \frac{V}{1000 \cdot A \cdot \Delta P \cdot t} \tag{1}$$

Where:
V: Volume of air crossing the surface during the test (ml)
A: Test surface area ($m^2$)
t: Test length (s)
$\Delta P$: Pressure difference (Pa)

The test has been done with a Bekk apparatus.

Method

Set a 15×15 mm sample in the measuring apparatus. With a manometer, adjust 100 ml of air on the sample, allowing the air to cross the sample and controlling the time required.

The time is expressed as Bekk seconds.

Water Absorption Determination. $Cobb_{30}$ Method.

The test is carried out according to UNE standard 54-027-74.

Water absorption is expressed in grams per square meter and calculated as follows:

$$C_{30} = 200 \cdot m \tag{2}$$

Where:
$C_{30}$: 30 seconds Cobb index or capability to absorb water per surface unit during 30 seconds ($g/m^2$).
m: weight increase (g)

The apparatus used for testing is described in UNE standard 54-027-74

Method

Weigh a test sample. It should be lower than 100 g with a weight approximation below 1 mg.

Set the sample with the fabric (the surface in touch with the filter paper) on the apparatus. Lock the sample and pour 70 $cm^3$ of water at 20°±1° C. From that moment the time is controlled by means of a stopwatch. After 20 seconds, put upside down the apparatus to retrieve all the water, and remove the sample. Put the sample between two sheets of blotting paper and roll a rolling pin over the hole to remove the excess of water.

Finally weigh the sample before the partial evaporation takes place.

Determination of Water Absorption and Thickness Increase by Means of Water Immersion The test is done according to UNE standard 57-112-79.

Method

Prepare the samples to test at 23° C. and 50% relative humidity. Weigh and measure the thickness of the sample. Submerge in distilled water the samples in an up-right position during 24 h±15 minutes.

Take out the sample from the water and holding it from a corner, let drain during 2 minutes all the excess of water. Finally weigh and measure the thickness of the sample Relative water absorption is calculated as follows:

$$A_r = \frac{m_2 - m_1}{m_1} \cdot 100 \tag{3}$$

Where:
$A_r$: relative water absorption (%)
$m_1$: conditioned sample weight before immersion in water (g)
$m_2$: sample weight after immersion in water (g)

Relative thickness increase is also calculated as follows:

$$E_r = \frac{t_2 - t_1}{t_1} \cdot 100 \qquad (4)$$

Where:
$E_r$: relative thickness increase (%)
$t_1$: conditioned sample thickness before immersion in water (mm)
$t_2$: sample thickness after immersion in water (mm)

It has been determined the length increase/decrease that a sample undergoes when humidity is changed (higroexpansivity) It is expressed in percentage. The test is carried out according to UNE standard 57-097-78.

Method

Introduce the samples in a container at 45±2% relative humidity. When reaching equilibrium (at least 12 hours), measure thickness, width, and length. Afterwards introduce the sample in a container at 83±2% relative humidity and allow it to reach equilibrium again (12 hours). Finally, take the same measurements as before.

Results are expressed as follows:

$$X = 100 \frac{I}{I_0} \qquad (5)$$

Where:
X: Relative increase of thickness, width, and/or length (%)
I: Increase of thickness, width, and/or length (mm) in the samples
$I_0$: thickness, width, and/or length of the sample at 45% relative humidity (mm)

Impact Noise Insulation Improvement Measurement

The impact noise test is carried out according to standard UNE-74040/8 equivalent to the standard ISO 140-8.

Weighted acoustic pressure level ($L_{now}$), is calculated based on the standard UNE 21314/75 equivalent to the standard ISO 717-2.

Method

To evaluate the impact insulation of a material two vertical adjacent rooms called emitting and receiving room are used.

The two rooms are separated by a normalized floor/ceiling structure where the insulating panel to test is installed. Acoustic pressure is measured on different areas of the samples to test:
$M_o$: base structure
$M_1$: parquet without panel
$M_2$: parquet with panel
$M_3$: parquet without panel and with load
$M_4$: parquet with panel and with load.

The floor of the emitting room is a 20 m² ($M_o$) area structure made of 120 mm thickness reinforced concrete. This structure lies on top of the receiving room. Between the slab and the walls there is a layer of neoprene.

Tests were carried out on parquet with and without panel, with and without 30 Kg/m² load ($M_1$, $M_2$, $M_3$, $M_4$). Parquet was made out of 1.264 m² of glued melamine strips. The panelled parquet was of the same type as mentioned above with 90 sheets which dimensions were 12×12×0.7 cm. The sheets were glued with same glue as the parquet to the reinforced concrete. The impact noise source is placed over the samples (Bruel 3204 type machine as standard specifies).

In the receiving room (50.48 m³), sound pressure is measured ($L_n$) by means of microphones. The 3 microphones used are positioned at different random heights.

Test environmental conditions are 22° C. and 65% relative humidity.

Magnitudes and measurement are defined as follows:

Acoustic pressure level (Ln) at normalized noise at each of the analyzed frequencies is defined by the following expression:

$$L_n = L_{no} + 10 \log \frac{A}{A_0} \qquad (6)$$

Where:
$L_{no}$: Acoustic pressure level at each frequency band in the receiving room (dB).
A: Equivalent absorption area measured in the receiving room (m²).
$A_0$: Structure area (m²).

The definition of insulation impact noise improvement (ΔL) at a determined frequency band is: Resultant normalized acoustic impact noise pressure level reduction after paneling the floor/ceiling structure of the two adjacent rooms. It can be resumed as follows:

$$\Delta L = L_{no} - L_n \qquad (7)$$

Where:
$L_{no}$: Normalized impact noise pressure level in the receiving room without paneling (dB).
$L_n$: Normalized impact noise pressure level in the receiving room with paneling (dB).

The impact noise source is placed at 5 different positions on the surface tested. Acoustic pressure level measures are taken in the receiving room. For each position, 3 acoustic pressure level measures are taken.

Integration time measure is 5 seconds for each reading. $L_{no}$ and $L_n$ are taken in real time with a spectrum analyzer. Spectrum frequency bands between 100 and 5000 Hz are analyzed in 1/3 octaves.

Weighted acoustic pressure level ($L_{now}$), is used to obtain a normalized acoustic pressure level, which takes into account humans hearing frequency sensibility sound field.

Weighted insulation impact noise improvement, $\Delta L_w$, is the difference between the reference weighted acoustic pressure level and the sample weighted acoustic pressure level:

$$\Delta L_w = L_{now} - L_{nw} \qquad (8)$$

Where:
$L_{now}$: Reference weighted acoustic pressure level (dB).
$L_{nw}$: Sample weighted acoustic pressure level (dB).

Aerial Noise Insulation Improvement Measuring

It has been determined the material aerial noise insulating capacity by two methods: the theoretical aerial noise insulation coefficient (R) and the experimental sound absorption coefficient (α) determined by Kundt's tube.

Aerial Noise Insulation Coefficient (R)

This coefficient is calculated theoretically working over the data obtained in the impact noise test.

According to standard NBE-CA-88 the material aerial noise improvement is determined as follows:

$$L_{n_w} = 135 - R \qquad (9)$$

Where:
$L_{nw}$: weighed impact acoustic pressure level (dB)
R: measured aerial noise insulation (dB).

R coefficient is a measure which relates acoustic intensity levels between two spaces separated by the material to study. Building and construction acoustic level standards are based on this parameter.

Determination of Kundt's Tube Sound Absorption Coefficient

The experimental sound absorption coefficient (α) is determined according to standard EN-ISO 110534-1.

The measurement has been taken according to the stationary wave method. A speaker emits a sound inside a tube with determined dimensions. On one end it has an analyzer connected to a microphone which can slide along the inside of the tube. The sample reflects the speaker's emitted waves resulting in stationary waves inside the tube. The stationary waves can be captured with the microphone. By measuring the maximum and the minimum acoustic pressure levels, the sample absorption coefficient can be calculated. The coefficient will be specific for the incident wave at zero degrees angle.

Human's hearing frequencies from 20 to 20,000 Hz. The environment's most usual frequencies are around 1000 and 5000 Hz. These ranges of frequencies are those that can be annoying.

Method

Place a 9 cm or 3 cm sample on one end of the tube (depending on the Kundt's tube to use). Place a microphone on the sample surface (maximum dB signal can be read on the analyzer). Next, slide along the tube until the minimum signal of the stationary wave is found. With the difference between the maximum and the minimum pressure levels, absorption coefficient can be obtained. Repeat this process for each frequency.

High frequency Kundt tube (Standing Wave Apparatus type 4002, Bruel & Kjaer) 30 mm inside diameter and 280 mm long. High frequency working band: between 800 and 6500 Hz.

Low frequency Kundt tube, 90 mm inside diameter and 170 mm long. Low frequency working band: between 90 and 1800 Hz.

Fire Study Behaviour

Fire test behaviour has been done according to standard UNE 23-721-90.

The standard defines a fire behaviour testing method able to be applied to all simple or building and construction materials independent from its thickness.

The test has been carried out in a radiation chamber.

Method

A 400×300 mm sample was made. It was introduced inside the radiation chamber. It was submitted during 20 minutes at 300° C. During this time, gases were emitted and flame was produced.

Density

The density is a measure of mass per unit of volume and is determined according to EN 323. The higher the density of an object is, the higher its mass per volume is.

$$\rho = m/V \quad (10)$$

ρ=Density
m=Mass
V=Volume $$V = r \cdot d^2 \pi \quad (11)$$

V=Volume
r=radius
d=thickness

The samples were abandoned during 12 hours at 23° C. at 50% relative humidity.

Afterwards their weight was measured with a balance and the volume was calculated by measuring the dimensions of the material. Density was determined by measuring the total mass and dividing it by the total volume.

The density of the material disclosed herein is lower than 0.500 g/cm$^3$ when the material is not pressed and equal or higher than 0.700 g/cm$^3$, but lower than 1, when pressed.

Tensile Strength

The tensile strength was measured referring to standard ISO 1924-1:1992. In general the tensile strength determines the force required to pull a material to the point where it breaks. This displays a very important parameter especially in the fields of material science or mechanical engineering.

More specifically, the tensile strength of a material is the maximum amount of tensile stress, which is possible to apply before failure, whereby the definition of failure is variable.

Figure 2:
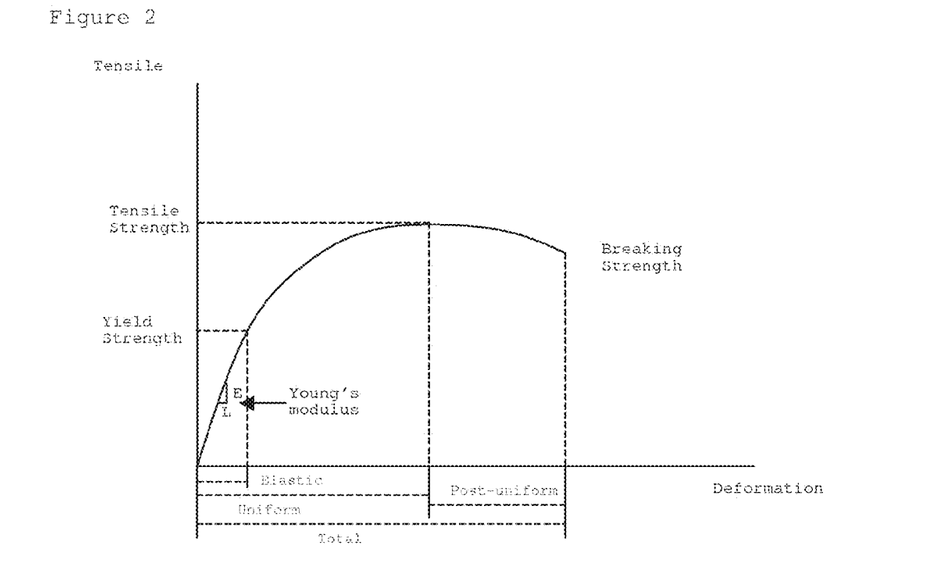
FIG. 2 shows the different definitions of tensile strength in the stress-strain curve graphic

The three typical definitions of tensile strength are:
Yield strength: The stress which a material can withstand without permanent deformation
Tensile strength: The maximum stress which a material can withstand
Breaking strength: The stress coordinate on the stress-strain curve at the point of rupture The different definitions of tensile strength are shown in the FIG. 2.

The progression of the curve is highly dependent on the material, due to its strength, brittleness or elasticity.

The tensile strength is measured in units of force per unit area; the units are Newtons per square meter (N/m$^2$) or Pascals (Pa). The values for representing the stress strain curve are calculated by the formulas 12 and 13.

$$\sigma = \frac{F}{d \cdot b} \quad (12)$$

σ = tension
F = force
d = thickness
b = width $$\varepsilon = \frac{D}{l} \quad (13)$$

ε = deformation
D = displacement
l = initial length

To analyze the tensile strength of the material, discs with a diameter of 18 cm are employed. Following standards, six samples were cut from these discs to carry out the measurement, so that the resulting value represents the average of six individual tests.

Figure 3:
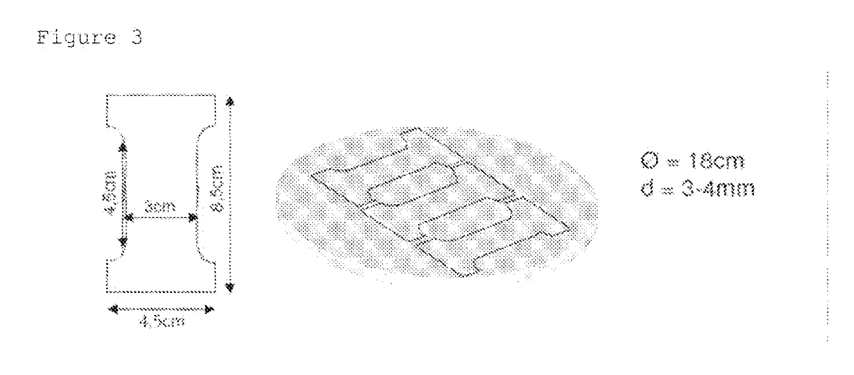
FIG. 3 shows the dimensions of tensile strength samples

The dimensions of the samples are shown in FIG. 3.

The samples are clamped with a distance of the clamps of exactly 63 mm. The measurement velocity is 1 mm/min.

The tests were carried out on a tensile test machine from the brand ADAMEL LOMARGHI.

Compressive Strength

Compressive strength is the capacity of a material to withstand axially directed pushing forces. When the limit of compressive strength is reached, materials normally crush.

To determine the compressive strength a compressive stress is applied on the material, which leads to its compaction or decrease of volume. Loading a structural element or a specimen will increase the compressive stress until reaching the compressive strength.

Compressive stress has stress units (force per unit area).

$$\sigma = \frac{F}{A} \quad (14)$$

$\sigma$ = tension
$F$ = force
$A$ = surface $$\varepsilon = \frac{D}{d} \quad (15)$$

$\varepsilon$ = deformation
$D$ = displacement
$d$ = thickness

To measure the compression resistance, samples were produced with a diameter of approximately 9 cm and a thickness of about 1-1.3 cm.

Figure 4:
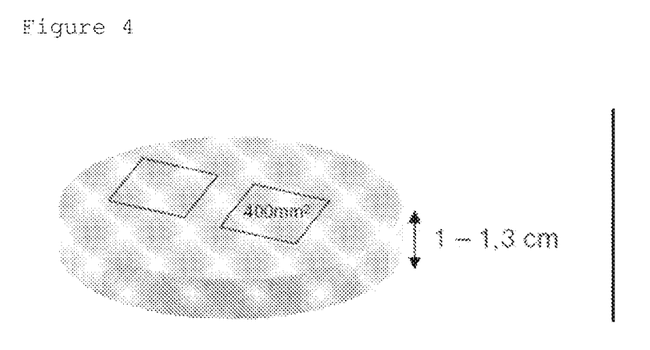
FIG. 4 shows the dimensions of the compression samples

The maximum load the tester amounted was 8000 N, consequently the surface area of the samples was reduced to 400 mm² (FIG. 4) to obtain valuable results.

The displacement limit of the tester displays 4 mm, therefore no maximum values could be obtained during the measurement. The samples were compared by the amount of deformation for a certain load of compression. The tests were performed with a velocity of 2.5 mm/min.

As for the tensile strength the compressive strength has to be determined by the data given from the tester (Tensile test machine ADAMEL LOMARGHI).

Flexural Strength

Flexural strength, also known as modulus of rupture or fracture strength: This mechanical parameter was measured referring to standard ISO 178-2001, and is defined as a material's ability to resist deformation under load.

This test employed a rod specimen having rectangular cross-section, which is bent until fracture using a three point flexural test technique. The flexural strength 2 0 represents the highest stress experienced within the material at its moment of rupture. It is measured in terms of stress, here given the symbol σ.

Calculation of the flexural stress $\sigma_f$ $$\sigma_f = \frac{3PL}{2bd^2}$$

in these formulas the following parameters are used:
$\sigma_f$=Stress in outer fibers at midpoint, (MPa)
P=load at a given point on the load deflection curve, (N)
L=Support span, (mm)
b=Width of test beam, (mm)
d=Depth of tested beam, (mm).

The flexural strength for a pressed material disclosed herein is higher than 30 MPa.

The results of these tests lead to the conclusion that the product obtainable by the process disclosed in the present invention presents the following characteristics: fire-resistant, thermal and acoustic insulation, water-proof characteristics, dimensional stability, low density, high mechanical resistance, hard as wood but capable of being molded, malleable and recyclable.

Due to these properties found in the product obtainable by the process disclosed in the present invention, this further relates to different uses of said product.

A first use is as building and construction material: for example as a insulator of parquet, partition wall, or insulating floor A second use is as an especial and ecologic packaging material.

A third use is as a eco-decorative material.

The term "eco-decorative material" as used herein is meant a material that can be used in decoration and/or refurbishment which needs to be recycled and recyclable, or come from a waste revalorization process.

Advantageously, the present product is eco-friendly overcoming the drawbacks of some of the products used for these purposes, such as expanded polystyrene or products with a lower consistency and more fragility, such as plasterboard or materials with a less eco-friendly production due to the formation of VOCs, such as agglomerate board.

Uses in the Building and Construction Industry

The properties the material presents when moulded: more resistant that the parts obtained in the actual fibre moulding process, with fire and water proof properties, and thermal and acoustic insulation, makes it ideal for substituting plastic parts used in the building and construction industry.

The expanded polystyrene market in the building and construction industry is big. The parts with special properties developed, moulded with the new material to substitute expanded polystyrene are:

Prefabricated Panels and Walls

This new material can be used as a component of the prefabricated panels and walls, and all kinds of boards (plaster, chips, fibres, etc.)

This material can be applied in this application, for the considered special boards (water and fire proof).

Domes, Waffles, and Pan Slab

This material lightens the structure weight and at the same time it reduces the concrete consumption.

Ceiling Panels

Thermal and acoustic insulating properties for this application are needed, on top of all there is the possibility of producing a surface finish with the required quality for straight away painting.

Facade Insulator

For this application, this material in front of expanded polystyrene has the advantage of being a fire proof material.

Ceiling and Floor Insulator

There are a large number of ways expanded polystyrene can be found as an insulator for floors and ceilings. The opportunity for the new developed material is to join functions of the several components needed to install parquet: the parquet itself plus the insulation material, reducing the install troubles (creases, rising floor, etc).

Uses in the Packaging Industry

There are 2 ways to reduce contamination: Increasing the national capability to recycle the product in question, or by reducing its use. Considering the different national successes recycling paper and cardboard, there is the political will to reduce the plastic consumption in favor of other materials. Some proposed examples in this direction: suppression of plastic bags in supermarkets in Spain, the prohibition of expanded polystyrene in food packaging in France, etc. All this, makes all recyclable packaging have new opportunities and water proof properties are important, property present in our material.

Packaging industry: food, cosmetics, appliances, and everywhere in general. Products are being refused because of inappropriate packaging. As the great numbers are one use only, measures and rules have started to come up to reuse and recycle materials.

Food and Medical Transport Isothermal Boxes.

On top of the needed insulating properties, the new material performs greater mechanical strength resistance, allowing bigger loads.

Divers Applications with Moulded Material

Insulating and decorative elements, protectors for corners, display elements, handicraft, etc.

The following examples are intended to further illustrate the present invention and should not be construed as limiting.

EXAMPLE 1

8 kg of the waste paper is pulped in a pulper with water at 15% consistency, during 15 min. After the pulp is diluted to 5% consistency with recycled water and it is introduced in a heated reactor with mechanical agitation. One per cent in DM of a mixture of enzymes containing: 30% of endocelulase (EC 3.2.1.4), 20% of xilanasa (EC 3.2.1.8) and 50% of glucosooxidase (EC 1.1.3.4) is added to the pulp. The agitation is kept at 300 rpm for 30 min. at 40° C. and controlling pH at 7. Then the speed is increased until 500 rpm and a 5% in DM of natural glue and aluminium salts is added. Maintaining the temperature at 40° C., it is shaken during 15 min at the same speed of rotation. After this treatment, the pulp is diluted until a consistency of 1% and it is then filtrated in a rectangular filter which dimensions are of 230×450 mm. The cake is stripped-down out of its filter, and taken to a forced air convection oven. This oven is initially at 150° C. and follows a gradient of 1° C./min until 80° C. is reached, staying at this temperature until the cake is entirely dried-out (approximately 5 h). Approximately, between 15 and 20 test plates of dimensions 230×450×10 mm are obtained. The waters of the filtrate are recycled in the first and second dilution of the pulp in the process. The yield in weight of the material with concerning the initial DM is 98%

Properties:

Air permeability results: 0.0059 μm/Pa·s $Cobb_{30}$ result: 49.6 g/m2

Relative water absorption (%): 21.68

Relative thickness increase (%): 3.44

Relative increases of thickness, width, and length

| $X_{thickness}$ (%) | $X_{length}$ (%) | $X_{width}$ (%) |
|---|---|---|
| 0 | 0 | −0.9 |

Figure 5:
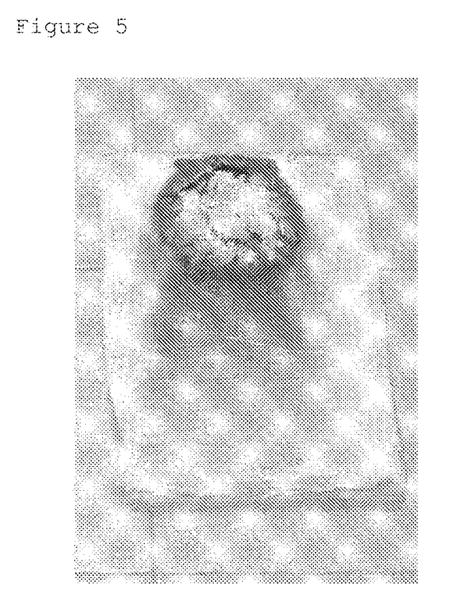
FIG. 5 shows the photography of a material sample after fire test.

Fire Behaviour (FIG. 5)

The sample tested shows burned the area where thermal radiation was applied. The combustion did not propagate to the rest of the sample. The material is reduced to ashes without hardly any incandescent spots.

During the 20 minutes of the test, no inflammable gases were emitted (possibly its majority being $CO_2$).

The observations done during the test were:
no burning
no flame
no dripping
no incandescent spots
emitted gases were not inflammable light grey (possibly $CO_2$).

The material is classified as M1 (according to UNE standard 23-721-90). This will depend on the kind of gases emitted.

EXAMPLE 2

8 kg of waste paper coming from packing cardboard recollection are pulped, adding 0.1% in DM of endocellulase (EC 3.2.1.4), in a pulper with water to a 15% consistency during 15 min. The pulp is then diluted to 10% consistency with recycled water and it is introduced in a heated reactor with mechanical agitation. Afterwards, 1% in DM of laccase (EC 1.10.3.2) is added. Maintaining the agitation at 300 rpm for 30 min. at 40° C. and controlling the pH at 6. Then the speed is increased up to 500rpm and a 5% in DM of natural glue containing colophony and aluminium salts is added. Maintaining the temperature at 40° C., it is shaken during 15 min at the same speed. After this treatment, the pulp is diluted to 1% consistency and it is then filtrated in a rectangular filter which dimensions are 230×450 mm. After filtrated, the cake is pressed at 30 bars in one electro-mechanical press at a speed of 400 N/s and then it is take to a forced air convection oven. This oven is initially at a temperature of 150° C. and follows a gradient of 1° C./min until 80° C. is reached, staying at this temperature until the cake completely dried-out (approximately 5 h). The filtrated water is recycled in the first and second dilution of the pulp in the process. The yield in weight of the material with concerning the initial DM is 98%

Properties:

Tensile Strength

Press sample: Tension 8 MPa
Deformation 1.6%

Compressive Strength

No press sample: Tension 5.5 MPa
Deformation 40%

Density: pressed sample 0.700 g/cm³
non-pressed sample: 0.430 g/cm³

EXAMPLE 3

8 kg of waste paper are pulped, adding a 1% in DM of endo, 1-4 beta xylanase (EC 3.2.1.8), in a pulper with water (15% consistency) during 15 min. The pulp is then diluted to 10% consistency with recycled water and it is introduced in a heated reactor with mechanical agitation. A 0.2% in DM of a watery prepared of hydrolases: endocellulase, hemicelullase and esterase is added to the pulp, and the temperature is kept at 50° C. during 30 min at pH 7. Then the rotation speed is increased up to 500 rpm and a 5% in DM of watery glue containing colophony and aluminium salts is added. Maintaining the temperature at 40° C., it is shaken during 15 min keeping the same speed. After this treatment, the pulp is diluted to 1% consistency and it is then filtrated with a mould filter of 450×320×200. Once the cake is filtered and stripped-down out of its filter, it is taken to a forced air convection oven. This oven is initially at 150° C. and follows a gradient of 1° C./min until 80° C. is reached, staying at this temperature until the cake is dried-out. The water of the filtrate is recycled in the first and second dilution of the pulp in the process. The yield in weight of the material with concerning the initial DM is 90%

Properties:

Flexural Strength

Pressed sample: 35 MPa

Normalized weighed acoustic pressure level results:

| Sample | $M_0$ | $M_1$ | $M_2$ | $M_3$ | $M_4$ |
|---|---|---|---|---|---|
| $L_{nw}$ (dB) | 79 | 62 | 60 | 65 | 62 |
| $\Delta L_{nw}$ (dB) | −1 | 16 | 18 | 13 | 16 |

Figure 6:
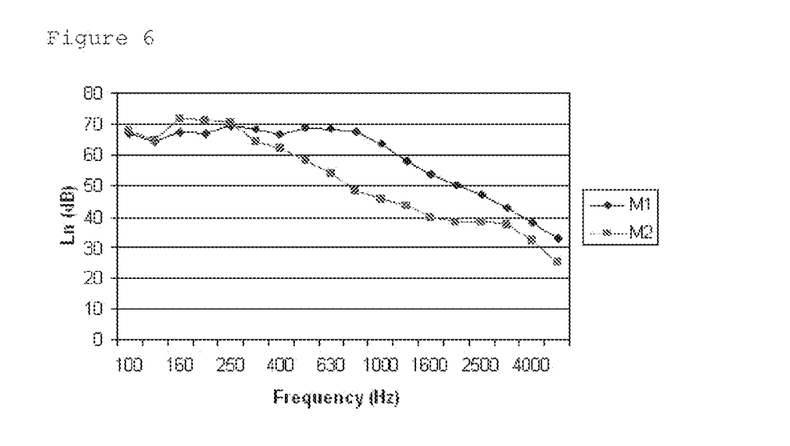
FIG. 6 shows the samples M1 and M2 with normalized weighted acoustic pressure measured at different frequencies.

FIG. 6 shows the normalized weighed impact noise acoustic pressure level ($L_n$) at different frequencies for samples $M_1$ y $M_2$.

Figure 7:
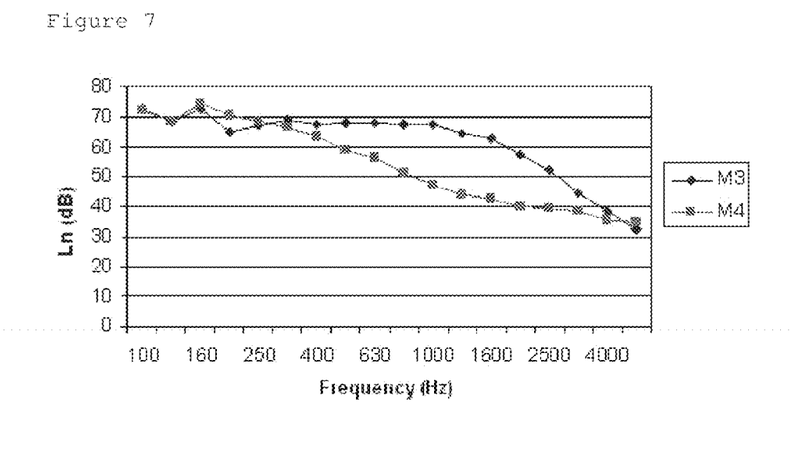
FIG. 7 shows the samples M3 and M4 normalized weighted acoustic pressure measures at different frequencies.

FIG. 7 shows the normalized weighed impact noise acoustic pressure level ($L_n$) at different frequencies for samples $M_3$ y $M_4$.

Sample α coefficient

| Frequency (Hz) | | | | | | | | | | |
|---|---|---|---|---|---|---|---|---|---|---|
| 2000 | 1600 | 1250 | 1000 | 800 | 700 | 600 | 500 | 400 | 300 | 200 |
| α 0.426 | 0.39 | 0.242 | 0.249 | 0.242 | 0.237 | 0.26 | 0.247 | 0.18 | 0.337 | 0.655 |

Figure 8:
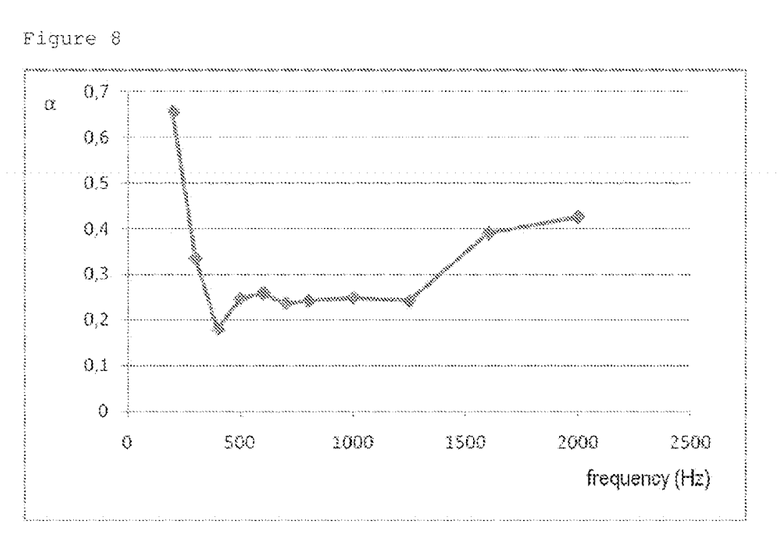
FIG. 8 shows the increases of α sound coefficient of the sample at frequencies.

FIG. 8 shows the coefficient increases at frequencies between 250 y 2500 Hz, range at which sound is annoying to humans.

The invention claimed is:

1. A process comprising the steps of:
    a) feeding waste paper into a pulper with water to yield a pulp, the waste paper having a consistency between 15 and 20%, wherein the waste paper comprises ashes between 15% and 40% and cellulosic fibers between 60% and 85%;
    b) diluting with recycled water the pulp obtained from step a) until a consistency between 5 and 10% is achieved;
    c) enzymatically treating the diluted pulp obtained from step b);
    d) adding one or more inorganic salts and one or more glues to the enzymatically treated diluted pulp obtained from step c) to determine variability in mechanical properties of a final material of the process, wherein the one or more glues comprise at least one of resin acids, salts thereof, and esters thereof;
    e) diluting with water material obtained from step d) until a consistency between 1 and 3% is achieved;
    f) filtering material obtained from step e) by vacuum and optional press;
    g) drying material obtained from step f);
    wherein there is a feedback of residual water suspension after step f) into containers where steps b) and e) take place; and
    wherein any residues resulting from the process are reused in the process itself.

2. The process according to claim 1, wherein step a) is carried out by additionally adding hydrolases.

3. The process according to claim 1, wherein the temperature for step a) is from 25 to 40° C. and pH between 5 and 9.

4. The process according to claim 1, wherein the pH of step c) is between 6 and 9.

5. The process according to claim 1, wherein step c) is carried out by oxidorreductases and laccases.

6. The process according to claim 1, wherein the one or more inorganic salts used for step d) is aluminum sulfate.

7. The process according to claim 1, wherein a consistency of the material at the end of step e) is between 1 and 3%.

8. The process according to claim 1, wherein temperature for step e) is between 25 and 40° C. and pH between 6 and 9.

9. The process of claim 1, wherein the cellulosic fibers comprise short-fiber hardwood between 70% and 80% with long-fiber conifer between 20% and 30%.

10. The process of claim 1, wherein the waste paper comprises at least one of offset paper and high-quality gravure magazine paper comprising waterproofing resins and water-resistant inks.

* * * * *